J. H. THAYER, DEC'D.
C. H. THAYER, ADMINISTRATOR.
GIN AND DELINTER SAW DRESSING MACHINE.
APPLICATION FILED DEC. 30, 1910.

1,086,483.

Patented Feb. 10, 1914.

Witnesses

C. H. Thayer
administrator of the estate of
J. H. Thayer
deceased Inventor.

by C. A. Snow & Co.
Attorneys

J. H. THAYER, DEC'D.
C. H. THAYER, ADMINISTRATOR.
GIN AND DELINTER SAW DRESSING MACHINE.
APPLICATION FILED DEC. 30, 1910.

1,086,483.

Patented Feb. 10, 1914.

J. H. THAYER, DEC'D.
C. H. THAYER, ADMINISTRATOR.
GIN AND DELINTER SAW DRESSING MACHINE.
APPLICATION FILED DEC. 30, 1910.

1,086,483.

Patented Feb. 10, 1914.

J. H. THAYER, DEC'D.
C. H. THAYER, ADMINISTRATOR.
GIN AND DELINTER SAW DRESSING MACHINE.
APPLICATION FILED DEC. 30, 1910.

1,086,483.

Patented Feb. 10, 1914.

C. H. Thayer
administrator of the estate of
J. H. Thayer
deceased Inventor, by C. A. Snow & Co.
Attorneys.

J. H. THAYER, DEC'D.
C. H. THAYER, ADMINISTRATOR.
GIN AND DELINTER SAW DRESSING MACHINE.
APPLICATION FILED DEC. 30, 1910.

1,086,483.

Patented Feb. 10, 1914.
10 SHEETS—SHEET 9.

C. H. Thayer
administrator of the estate of
J. H. Thayer
deceased Inventor.

by C. A. Snow & Co.
Attorneys

UNITED STATES PATENT OFFICE.

JULIEN H. THAYER, DECEASED, LATE OF MOUNT PLEASANT, NORTH CAROLINA, BY CHARLES HOLMES THAYER, ADMINISTRATOR, OF MOUNT PLEASANT, NORTH CAROLINA.

GIN AND DELINTER SAW-DRESSING MACHINE.

1,086,483. Specification of Letters Patent. Patented Feb. 10, 1914.

Application filed December 30, 1910. Serial No. 600,171.

*To all whom it may concern:*

Be it known that I, CHARLES H. THAYER, a citizen of the United States, residing at Mount Pleasant, in the county of Cabarrus and State of North Carolina, administrator of the estate of JULIEN H. THAYER, deceased, late a citizen of the United States, residing at Mount Pleasant, in the county of Cabarrus and State of North Carolina, do hereby declare that JULIEN H. THAYER invented a new and useful Gin and Delinter Saw-Dressing Machine, of which the following is a specification.

The invention relates to that type of gin and delinter saw gumming machines illustrated in patent of Julien H. Thayer, No. 743,771 granted November 10, 1903, and it has special reference to simplifying the construction and arrangement of parts to insure a more positive and direct action both in cutting and dressing the teeth of the saw and in feeding the same, and more especially in accurately positioning the teeth of the saw for the action of the cutter.

With these general objects in view the invention consists in a certain novel construction and arrangement of parts as will be hereinafter more particularly described, it being understood that various changes in the form, proportion, and minor details of construction may be resorted to without departing from the spirit or sacrificing any of the advantages of the invention as defined by the appended claims.

In the drawings.

Similar reference characters indicate corresponding parts in all figures of the drawing.

The machine constituting the present and preferred embodiment of the invention may be regarded generally as comprising, saw feed mechanism by which after the treatment of one tooth of a saw, the latter is fed a distance sufficient to bring the next or succeeding tooth into position for treatment, a cutting or dressing mechanism by which the teeth are gummed, or the throats are cut out, deepened, or otherwise acted upon, and chip extracting or clearing mechanism by which the throats of the saw teeth are cleaned or cleared to remove chips and other obstructions preparatory to the action of the gummer or cutter, the construction of the chip extractor in the present case, being such as to adapt it to perform the additional function of a justifier or auxiliary feed to insure the accurate registration of the throat of the tooth to be acted upon with the die or cutter members. For facility of operation the various features comprising the machine are actuated from a common drive shaft 20 provided with a suitable operating crank 21, said shaft being mounted preferably at one end of the frame of the machine which also is provided with an adjacent grip 22 by which the machine may be steadied in operation, a suitable supporting leg 23 being connected with the framework, as for example by a transverse detachable pivot pin 24 engaging suitable registering openings in feet 25 depending from said frame. An auxiliary intermediate foot 26 may also be employed to bear upon a suitable or convenient portion of the gin saw frame or casing, while the end of the machine remote from the drive shaft is supported on the gin saw under treatment, through the medium of a pivotal arcuate foot 27 of a construction adapting it to various diameters and characters of saws. In the construction illustrated, this saw engaging foot comprises adjustably connected members 28 and 29 mounted on the common pivot bolt 30 and secured in the desired relative positions by a clamp bolt or member 31 engaging a slot in the foot member 28, the slot being illustrated at 32, and the extremities of the foot members respectively carry shoes 33 and 34 which bear upon the periphery of the saw, are pivotally connected with said members to adapt them to assume varying angular positions to suit the diameter of the saw and are constructed to remain in contact with the peripheral teeth of the saw without injury thereto. Also an intermediate guide finger 35 may be provided to coöperate with a slotted bracket 36 secured to the frame 37 and provided with a longitudinal slot 38 which allows for adjustment of the pivot bolt 30 of the shoe. By this means the shoe is adapted for adjustment longitudinally and obliquely of the frame to suit varying diameters of saws. The feeding head 39 which also rests upon the periphery of the saw which is under treatment is provided with front and rear bearing shoes 40 and 41, of which the latter operates between said finger 35 of the shoe 27 and the bracket 36, to thereby insure the accurate guiding of the feeder head in its longitudinal movements. Also the rear guiding foot 41 of the feeder head is connected with said feeder head for angular adjustment by means of a pivot bolt 42 and a clamp bolt 43 extending through a slot 44 in said foot. It will be noted that this adjustment is also designed to adapt the mechanism for use in connection with saws of different diameters, the adjustment of the saw engaging members of the feeder head being of necessity in agreement with the adjustment of the shoes of the pivotal bearing foot 27.

As before indicated the function of the saw feed mechanism is to advance the saw step by step in the intervals between the cutting or dressing operations of the machine, and this periodic or successive reciprocatory movement of the feeder head is secured by means of a rocker 45 pivotally mounted as at 46 to the main frame, having a yoke 47 in engagement with a cam 48 carried by the drive shaft 20. Said rocker also carries an adjustable block 49 connected by a link or pitman 50 with the feeder head, the adjustment of said block 49 toward and from the pivotal point of the rocker being effected by a feed screw 51 to vary the throw of the link and hence the feeder head, and a plurality of openings 52 being provided in the link for engagement with a pin 53 on the feeder head, to adapt the feeder head to be positioned forwardly and rearwardly to suit the diameter of the saw.

Obviously during or simultaneously with the feeding or forward movement of the feeder head it is necessary that the saw shall be clamped to insure the proper and accurate movement of the saw around its axis as a center, to successively bring the teeth into position for treatment, and for this purpose there is employed a clamp having a movable jaw 54 coöperating with a fixed jaw 55 located adjacent to the forward feeder shoe 40, said movable jaw having a pivot 56 mounted in suitable bearings in the feeder head and yieldingly held in position to release the saw by means of a spring 57 acting against a radial pin 58 on said pivot or spindle 56.

To the spindle of the movable clamp jaw 54 is secured a crank arm 59, preferably having a terminal anti-friction roller 60 coöperating with a cam 61, to the spindle 62 of which is connected an arm 63, and this arm is in turn connected by a link or rod 64 with a rocker 65, also actuated by the main or drive shaft of the machine through the following mechanism: Secured to the drive shaft 20 is an eccentric gear 65′ having a wrist pin 66 from which extends a pitman 67 comprising telescoping members 68 and 69 of which the latter is terminally connected with a wrist pin 70 on the rocker 65. The member 68 of the telescopic pitman carries a latch 71 for engagement with a shoulder or catch 72 on the wrist pin 70 whereby when the parts are in their normal or operative positions relative movement of the members of the pitman is prevented, and the motion of the gear 65′ on the drive shaft is communicated to the rocker. When it is desired to disconnect the feed mechanism, or render it inoperative, this latch may be disengaged to permit the idle reciprocation of the tubular member 68 of said pitman. The link or rod 64 is connected with the rocker by means of a clamp 73 having a screw 74, and by the adjustment of the rod or link in this clamp, the point in the operation of the machine at which the feeder clamp will operate can be controlled accurately, to insure the proper coöperation of the parts. After a forward or feeding movement of the feeder head, the return movement is effected by a spring 75 connected at one end to said head by means of a clip 76 having a plurality of seats, to provide for varying the tension of the spring, and connected at the other end with the main frame by means of a hook 77.

The cutter mechanism consists essentially of fixed and movable jaws or members 78 and 79 of which the latter is mounted as at 80 for pivotal movement and carries a cutter head 81 in which is suitably clamped a bit 82, adapted for transverse movement with the movable jaw to coöperate with a female die member 83 secured to the main frame and preferably consisting of a disk provided with a plurality of kerfs or throats any of which may be arranged in coöperative relation with the bit, and in registration with a chip throat 84 in the fixed jaw of the cutter mechanism. A toggle arm 85 suitably mounted on bracket arms 86 extending from the fixed jaw 78 and embracing the movable jaw 79 is connected by a knuckle joint 87 with the movable jaw whereby when the free end of said toggle arm is moved toward the cutter head the movable jaw carrying said cutter head and bit is moved transversely to cause the bit to act upon a saw arranged in contact with the die member, which is capable of accuracy of adjustment through the medium of a plate 88 carrying said die member and having a slot 89 through which extends a clamp screw 90. The die member is locked in the seat provided for its reception in said plate by means of a set screw 91.

Figure 1:
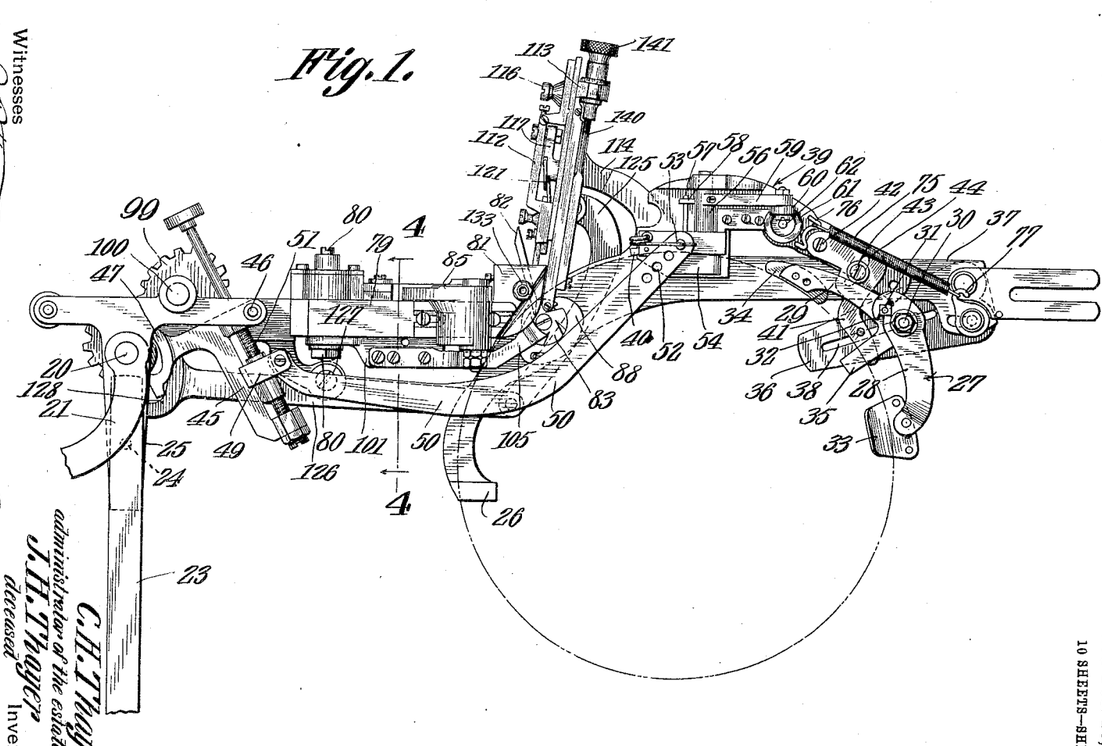
Figure 1 represents a general side view of the machine as shown applied to a gin saw.
Figures 2, 3:
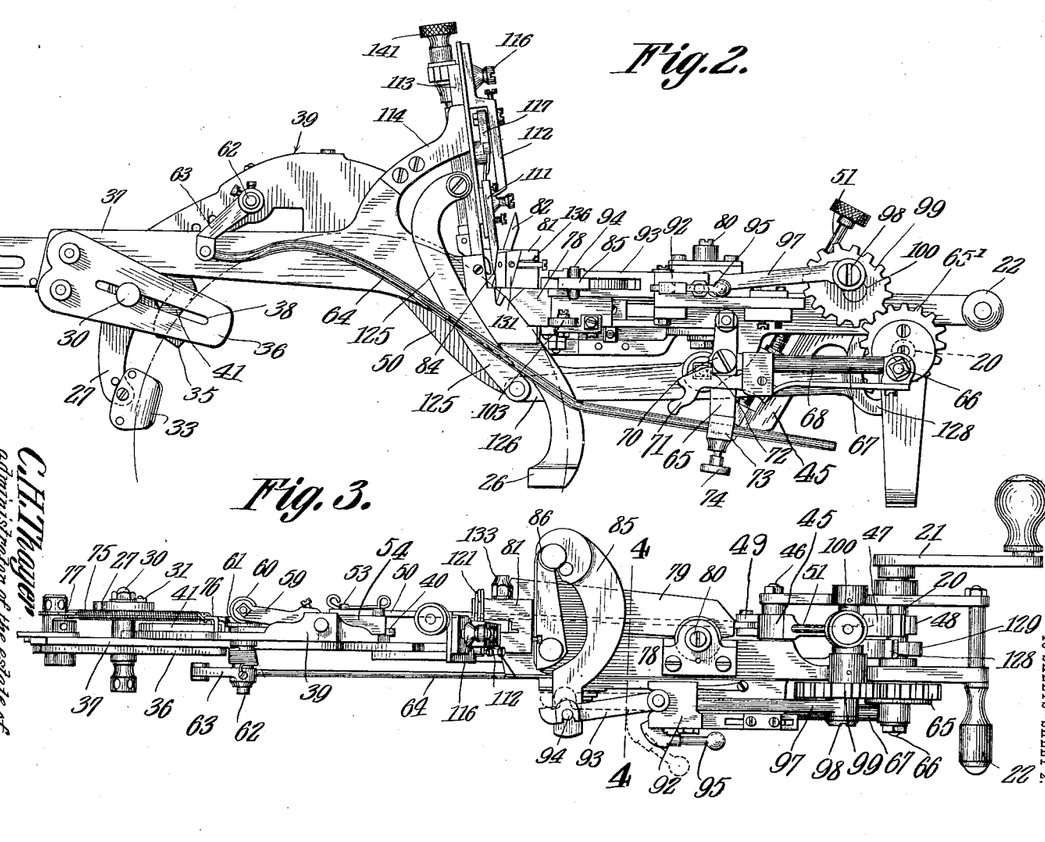
Fig. 2 is a side view showing the opposite side of the machine from Fig. 1.
Fig. 3 is a plan view of the machine.
Figure 4:
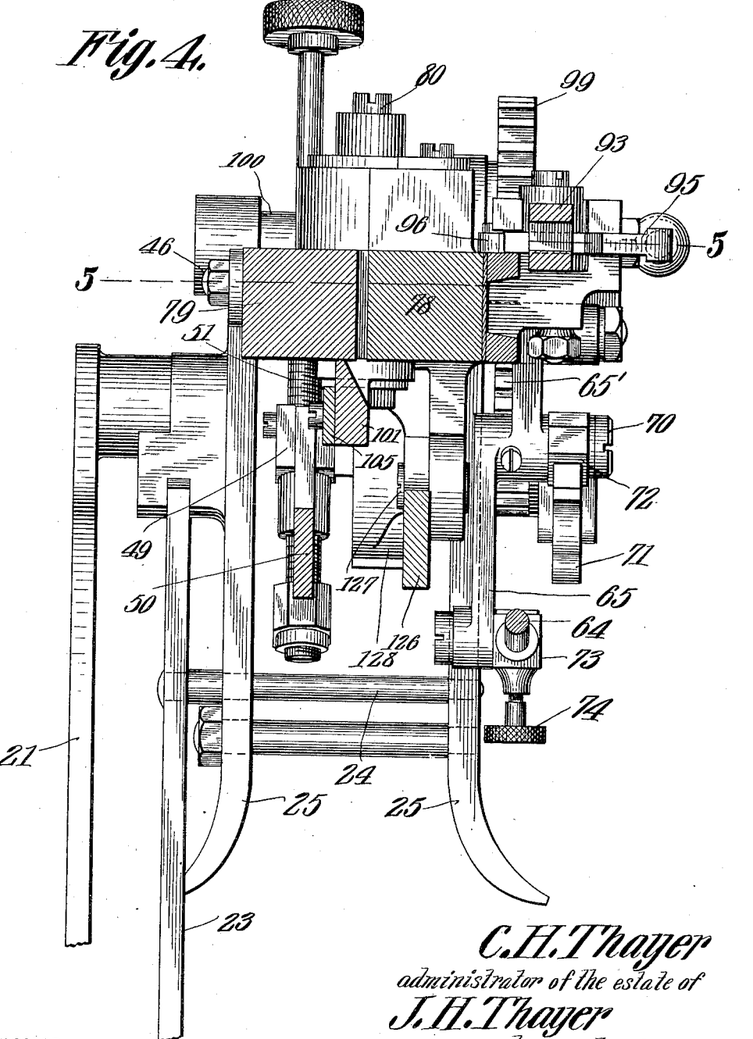
Fig. 4 is a vertical transverse sectional view on the plane indicated by the lines 4—4 on Figs. 1 and 3.
Figures 5, 18, 19, 20:
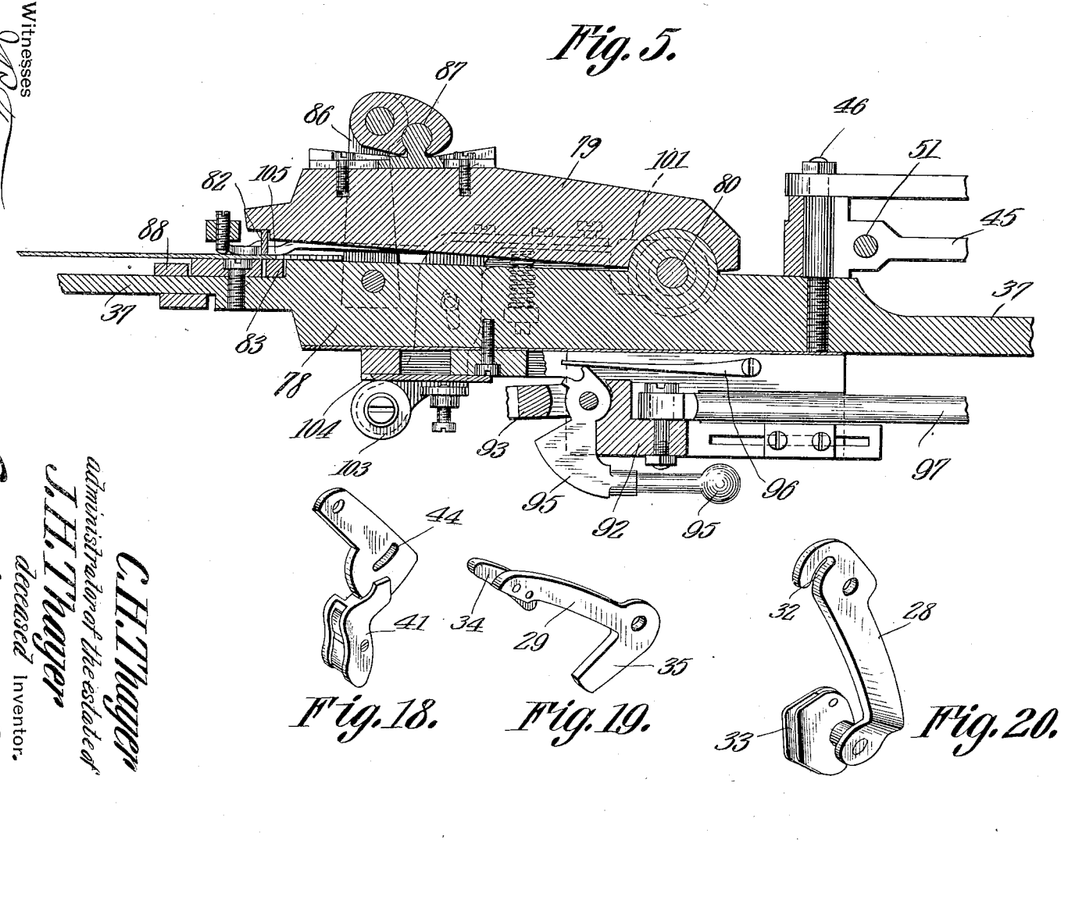
Fig. 5 is a longitudinal horizontal section of a portion of the machine taken through the cutter actuating mechanism, the horizontal plane of the section being indicated by the line 5—5 of Fig. 4.
Figs. 18, 19 and 20 are detail views of the saw engaging foot.
Figure 6:
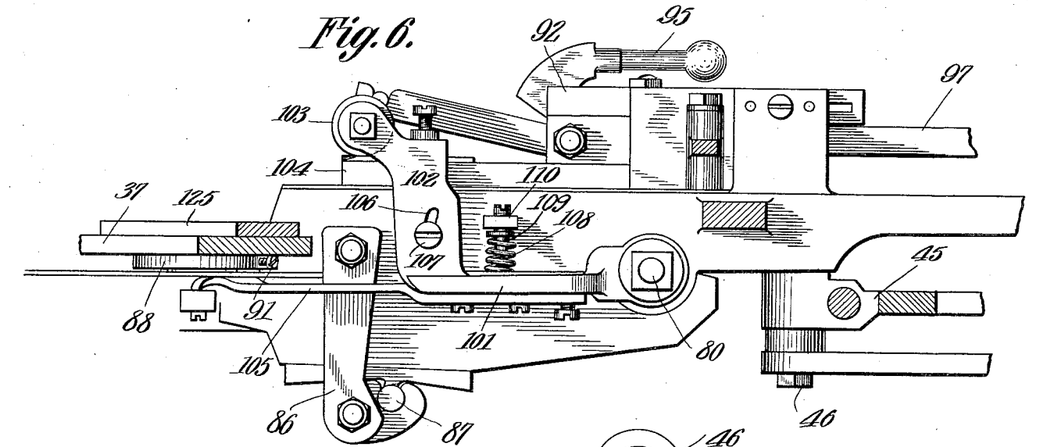
Fig. 6 is a bottom plan view of the portion of the machine indicated in Fig. 5.
Figure 7:
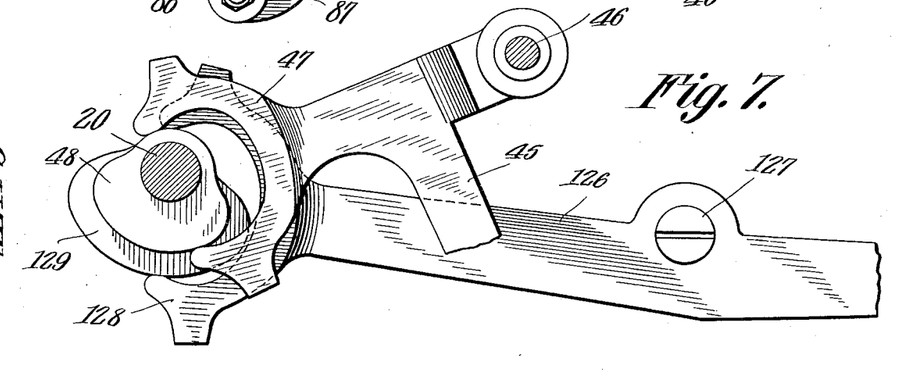
Fig. 7 is a detail view showing the main operating cams.

The actuating means for the toggle arm by which the movable jaw of the cutter mechanism is operated include a cross head 92 carrying a latch 93, detachably engaged with a pin 94 on the free end of the toggle arm and adapted to be thrown out of engagement with said pin by means of a cam lever 95 pivotally mounted on the cross head, and coöperating with a spring 96 by which said lever is held in either of its set positions,—namely with the latch either in engagement or out of engagement with the pin 94 on the toggle arm. The detachment of the toggle arm from the actuating means provides for disconnecting the cutter mechanism when desired without affecting the other parts of the mechanism, and such detachment being effected simply by throwing the cam lever 95 to the dotted line position indicated in Fig. 3. The cross head is connected by a pitman 97 with a wrist pin 98 on an eccentric gear 99 carried by a counter or driven shaft 100, said gear receiving its motion from and meshing with the gear 65' on the driving shaft. After the completion of the forward feeding movement of the saw and at the moment of release of the saw by the feed clamp, it is desirable to firmly clamp the saw adjacent to the point at which the cutting mechanism will act thereon in order to avoid shifting of the saw during the cutting operation, and to effect this object there is provided a saw clamp 101 disposed beneath the movable jaw of the cutter mechanism, fulcrumed at 80, co-axially with the movable jaw, and provided with an arm 102 bearing a terminal anti-friction roller 103 with which coöperates a wedge 104 carried by and projecting from the cross head 92 and adapted at a certain point in the operation of the mechanism to be interposed between said anti-friction roller and the main frame of the machine. Yielding pressure is applied to the saw by constructing said saw clamp with a yielding finger 105, as shown most clearly in Fig. 6, and the clamp is accurately guided by means of a slot 106 and guide pin 107, and is promptly removed from contact with the saw to release the same for further feeding movement by a spring 108 which by means of the screw 109 operating in the bracket 110 can be adjusted in tension.

Figure 10:
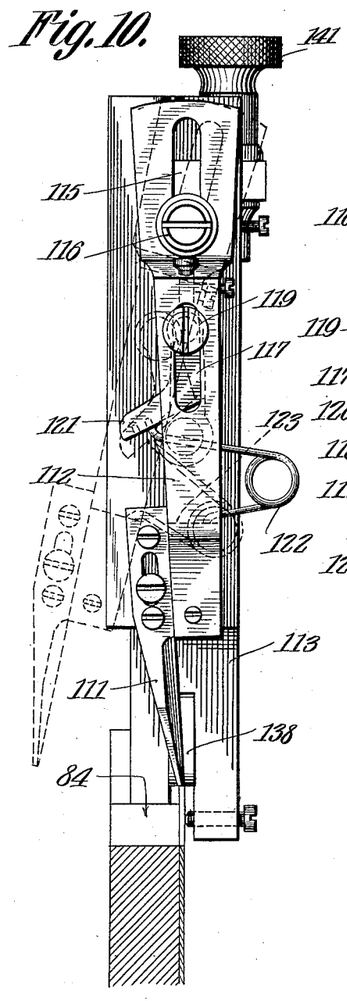
Fig. 10 is a face view of the chip extractor or cleaner.
Figure 11:
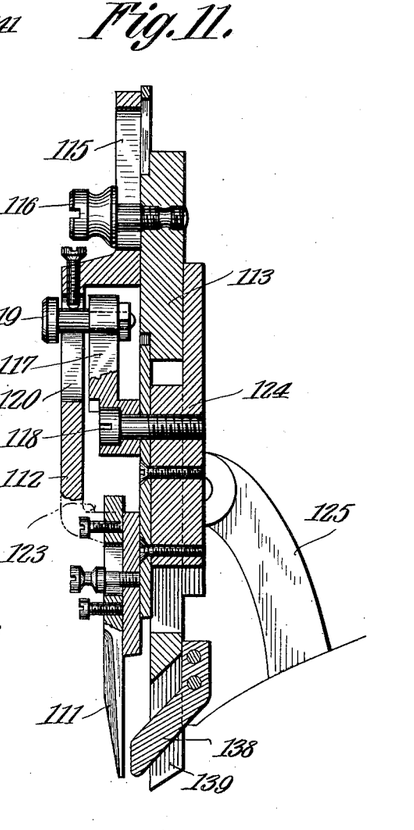
Fig. 11 is a vertical sectional view of the same.
Figures 12, 13:
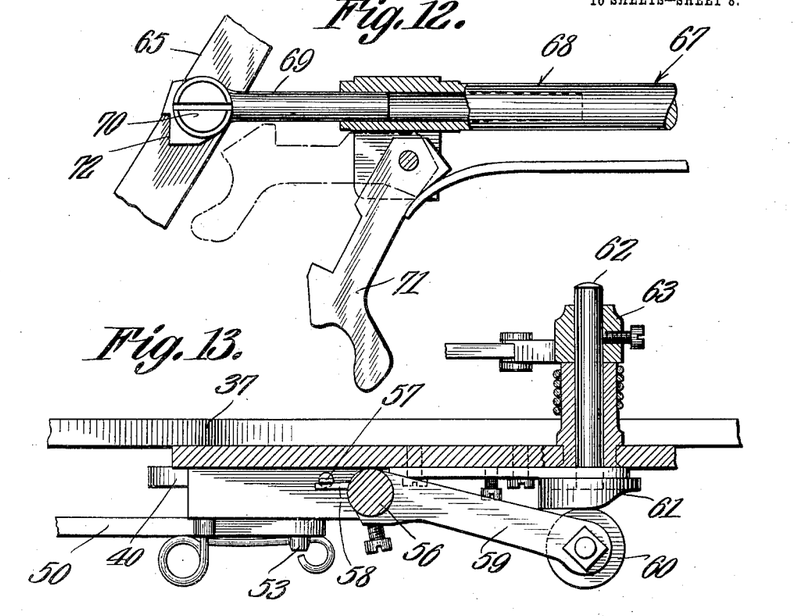
Fig. 12 is a detail side view showing the latch by which the feed clamp is thrown out of operation.
Fig. 13 is a detail horizontal section of the feed clamp operating means.
Figure 14:
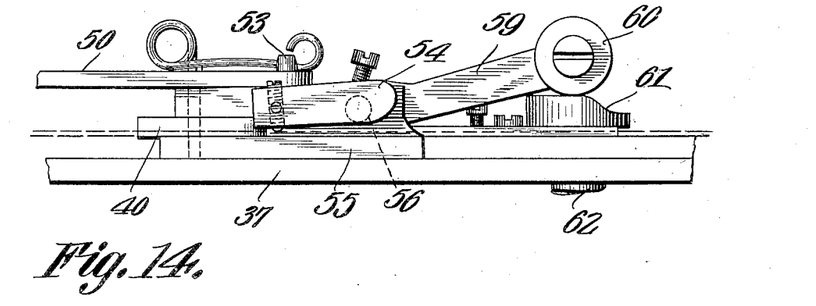
Fig. 14 is a reverse plan view of the feed clamp and operating means.
Figures 15, 16, 17:
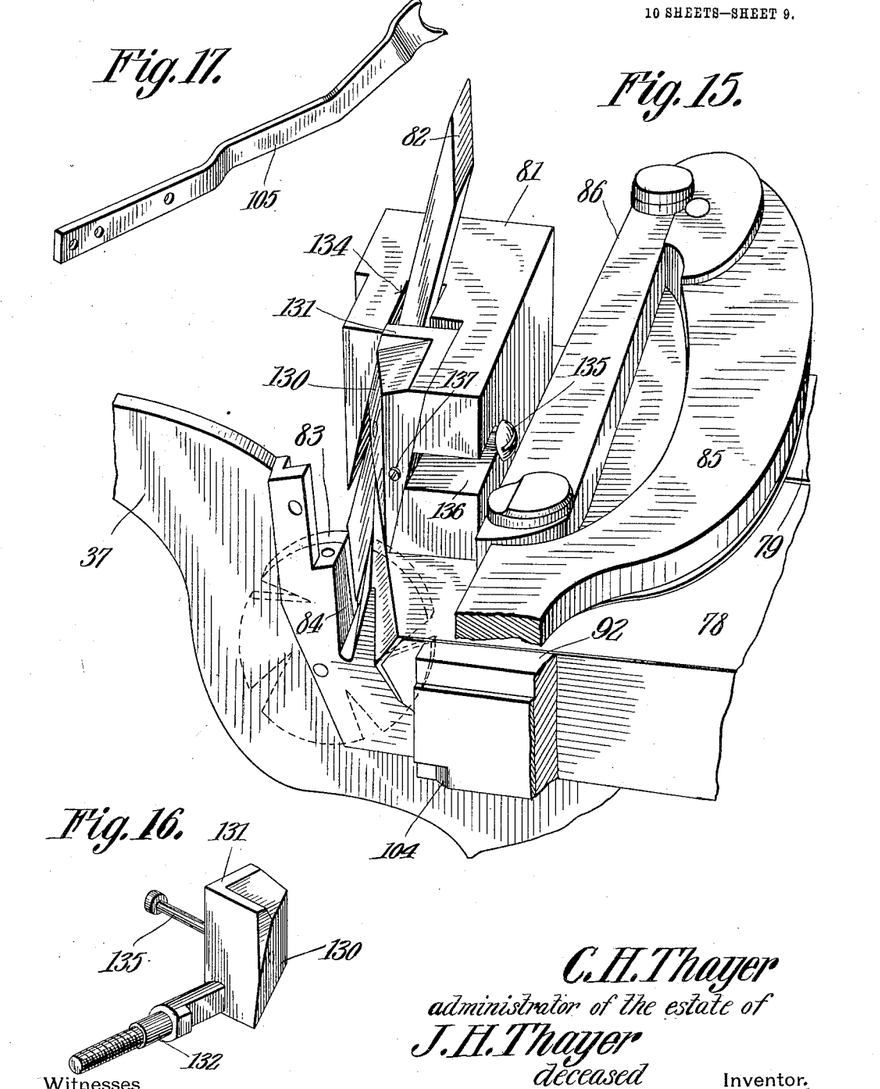
Fig. 15 is a detail in perspective of the cutter-head and coöperating parts.
Fig. 16 is a perspective view of the bit-clamp.
Fig. 17 is a perspective view of the saw clamp finger.
Figure 21:
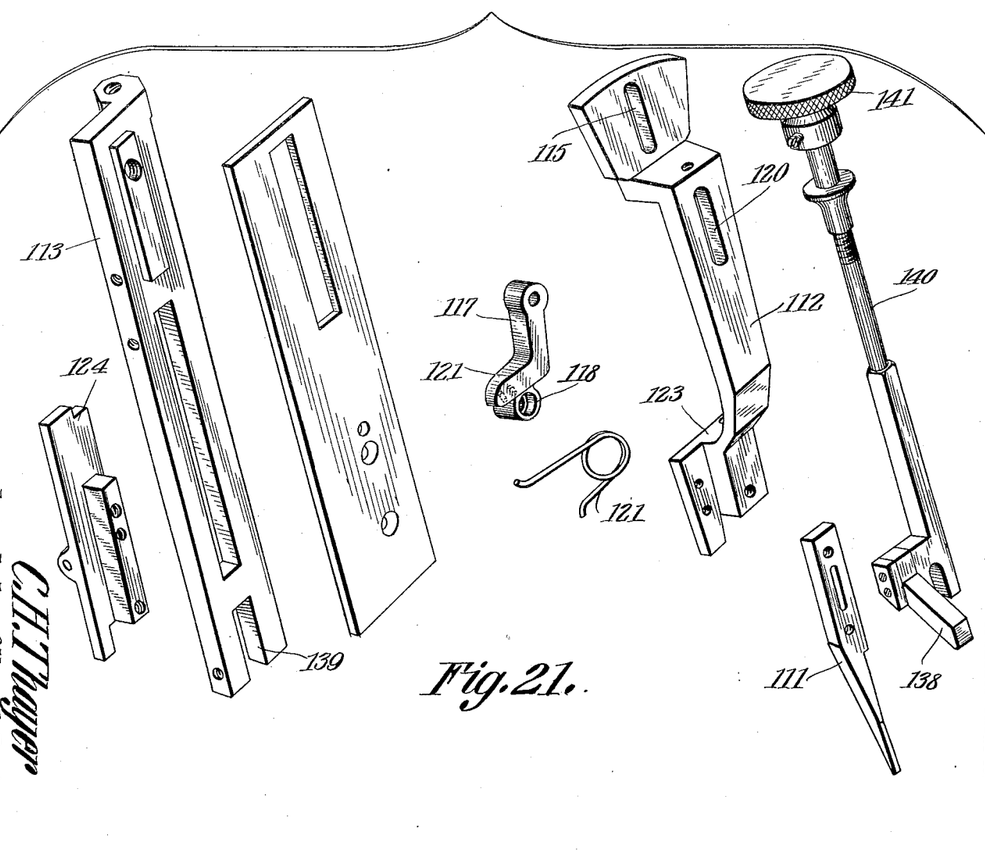
Fig. 21 is a detail view with the parts detached, of the chip extractor and auxiliary feed.

The chip extractor mechanism, as hereinbefore indicated, is designed to clear the throats of the saw teeth in advance of the operation of the cutter, and in the construction illustrated embodies essentially a blade or finger 111 adjustably connected with a wiper arm 112, movably mounted for a combined reciprocatory and swinging movement upon an inclined support 113 rising from the main frame and strengthened by a brace 114. The wiper arm is slotted as shown at 115 to receive a guide pin 116, while a crank arm 117 pivotally mounted as at 118 on the support 113 is provided with a wrist pin 119 operating in a slot 120 in the wiper, to permit of lateral swinging movement of said wiper in addition to a vertical reciprocatory movement which is possible by reason of the slot 115 and guide pin 116. The crank 117 carries a lateral arm 121 with one of a plurality of sockets in which is engaged one end of a spring 122, the other end of said spring being seated in a similar socket in a shoulder or offset 123 of the rocker. The tendency of this spring acting upon the lateral arm of the crank arm 117, is to maintain the wiper yieldingly in the normal position indicated in Fig. 10, while permitting a lateral swinging movement of the lower end of the wiper, to cause the finger 111, after being depressed to the bottom of the throat of a saw tooth, to be moved laterally outward, to eject chips or other obstructions through the chip throat 84. The arrangement of this spring 122, however is also such that when the wiper is moved to the dotted line position indicated in Fig. 10 it will be held yieldingly against accidental return, thus providing for removing the wiper from its operative position when desired, in the course of adjusting other parts of the mechanism, or when it is necessary to permit of operation of the other parts without utilizing the wiper. This lateral displacement of the wiper is also advantageous in recutting saws.

Figures 8, 9:
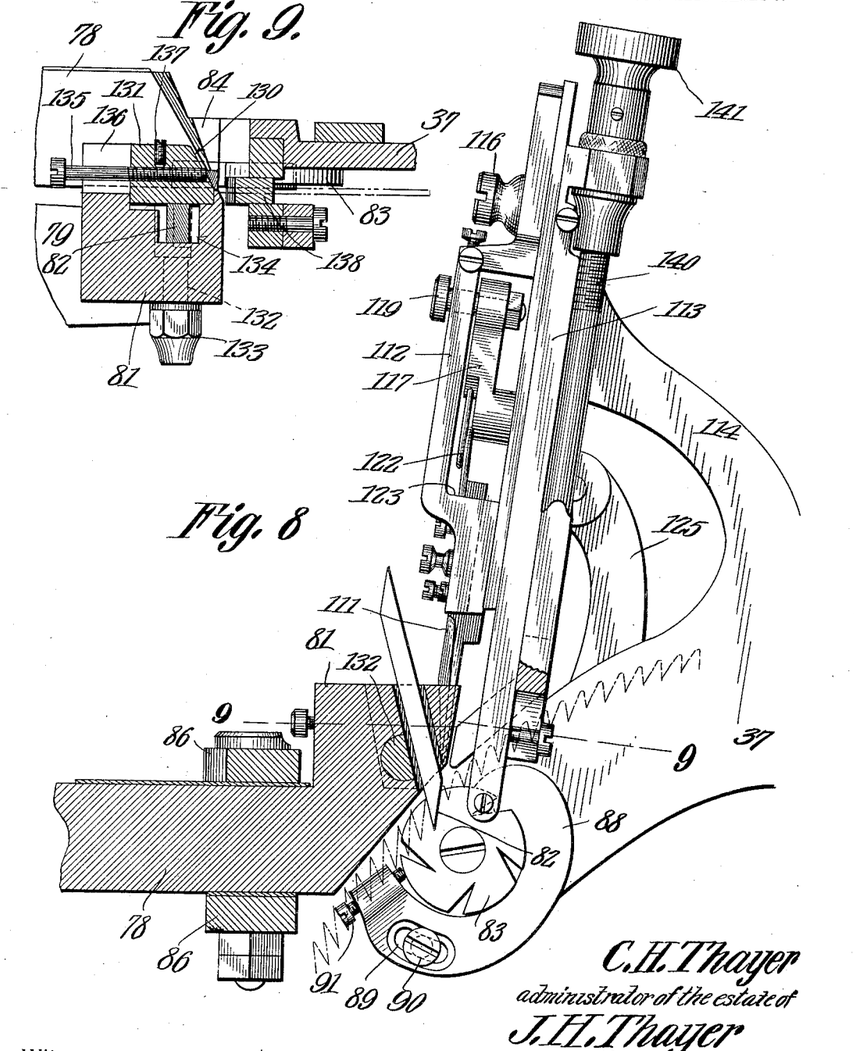
Fig. 8 is a vertical longitudinal sectional view of and in the plane of the cutter mechanism.
Fig. 9 is a detail horizontal sectional view on the plane indicated by the line 9—9 of Fig. 8.

The reciprocatory movement of the wiper is secured by means of a guide block 124 mounted on the support 113 and connected by the pivot screw 118 with the crank 117, and a link 125 connecting said guide block with a rocking lever 126 fulcrumed at an intermediate point as shown at 127 to the frame of the machine, the other end of said rocking lever being provided with a yoke 128 actuated by the cam 129 on the drive shaft 20. The relation between the parts is such that the downward reciprocatory movement of the wiper precedes the lateral movement of the cutter head, but as the wiper or clearing finger 111 approaches the limit of its downward movement it receives a lateral impulse by the contact of a cam face 130 (see Fig. 9) formed on a clamp block 131 which constitutes the head of a clamp bolt 132 extending through the cutter head 81, and engaged by a nut 133, said clamp block serving to lock the bit 82 in the bit socket or recess 134 of said cutter head. A guide screw 135 operating in a slot 136 and locked in place by a set screw 137 serves to hold said clamp block in proper position with reference to the cutter head. Owing to the described relations of the parts the wiper finger as it descends into the throat of the saw tooth, is swung laterally through the throat of the tooth and is followed closely by the bit, removing from the path of the bit any chips or other obstructions in the throat of the tooth and ejecting the same into the chip throat 84. It will be noted however, that the downward motion which is imparted to the wiper is communicated thereto through the spring 122, owing to the fact that the block 124 moves the crank 117 downward, while said crank through its arm 121 tends to depress the spring and thereby convey motion through it to the shoulder of the wiper arm 112. If therefore the wiper finger comes in contact with any immovable object in its downward movement, said spring is adapted to yield sufficiently to avoid breakage. However so far as forward and rearward movement is concerned the wiper finger is positively guided, and therefore if the tooth throat which is to be operated upon is not in accurate registration with the die member, and therefore in proper position for the action of the bit, said wiper finger will center the tooth throat, just in advance of the tightening of the saw clamp 105 which latter takes place before the bit, in its lateral movement, comes in contact with the saw blade.

A presser finger 138 operates in a slot 139 in the support 113 and is designed to bear upon the periphery of the saw to act as a guide to assist in positioning the cutter relatively to the saw, the adjustment of said finger being effected by a threaded rod 140 engaged by a milled nut 141.

What is claimed is:—

1. The combination with saw treating mechanism, of a reciprocatory feeder head, a feed clamp, a crank arm, a resilient connection between the feed clamp and crank arm, a cam for actuating said crank arm, and means for simultaneously and independently operating said feeder head and cam.

2. The combination with saw treating mechanism, of a reciprocatory feeder head provided with shoes for riding the saws, a feed clamp having a movable jaw, a crank arm, a resilient connection between the feed clamp and crank arm, a cam for actuating said crank arm, and means for simultaneously and independently operating said feeder head and cam.

3. The combination with a saw treating mechanism of a reciprocatory feeder head provided with shoes for riding the saw, a feed clamp having a movable jaw, a crank arm, a cam for actuating said crank arm, a resilient connection between the feed clamp and crank arm, means for reciprocating the feeder head, and independent means for rocking said cam.

4. The combination with saw treating mechanism of a feeder head provided with a feed clamp for engaging the saw, independent means for actuating said feeder head and clamp, said feeder head having shoes for riding a saw, and one of said shoes being angularly adjustable with reference to the feeder head, a pivotal foot provided with shoes for engaging the periphery of the saw and provided with an intermediate guide finger, and a bracket supporting said foot and spaced from said finger thereof, the adjustable shoe of the feeder head being guided between said finger and bracket.

5. The combination with saw treating mechanism, of saw feeding mechanism having a feeder head and means for actuating the same, a feed clamp mounted upon the feeder head and including a rock shaft having a resiliently connected crank arm, a rocker arm and means for communicating oscillatory movement thereto, and a link or rod connected with said crank arm and having adjustable connection with the rocker arm.

6. The combination with saw treating mechanism of saw feeding mechanism having a feeder head and means for actuating the same, a feed clamp mounted upon the feeder head and including a rock shaft having a resiliently connected crank arm, a rocker arm and means for communicating oscillatory movement thereto, said means including a detachable connection, a clamp on the rocker arm and a link or rod connected with said crank arm and adjustably engaged by said clamp.

7. The combination with saw treating mechanism, of a feed mechanism and means for actuating the same, a feed clamp, a rocker arm and connections between the same and the feed clamp, a rotary driving member, and connections between said rotary driving member and said rocker arm, consisting of a pitman comprising telescoping members, and a latch for securing said members in operative relation.

8. The combination with saw treating mechanism, of a feed mechanism and means for actuating the same, a feed clamp, a rocker arm, and connections between the same and said feed clamp, a rotary driving member and connections between same and said rocker arm, said connections including a pitman having telescoping members terminally attached respectively to said driving member and the rocker arm, and a spring held latch mounted upon one of the telescoping members and engaged with the other of said members to permit of the release of the rocker arm.

9. The combination with saw feeding mechanism and means for actuating the same, of cutter mechanism having coöperating members and means for actuating one of said members including a reciprocatory cross head, a toggle arm, a pivotal link connecting said cross head and toggle arm, and detachably engaged with one of them, and resilient manually controlled means for engaging and disengaging the link to lock and release the cutter mechanism.

10. The combination with saw feeding mechanism and means for actuating the same, of cutter mechanism having coöperating members and means for actuating one of said members, said means including a reciprocatory cross head, a toggle arm, a pivotal link connecting the cross head and toggle arm and detachably engaged with one of them, said link being yieldingly held in engaging position, and a cam lever for moving said link to disengaged position.

11. The combination with saw treating mechanism, of saw feeding mechanism having a feeder head and means for actuating the same, a feed clamp mounted upon the feeder head and including a rock shaft having a resiliently connected crank arm, a rocker arm, a two membered slidable connection for connecting the rocker arm for oscillatory movement, manually operable means for connecting and disconnecting the members of said connection for movement in unison or the independent movement of one, and a clamp on the rocker arm.

12. The combination with saw treating mechanism, of saw feeding mechanism having a feeder head and means for actuating the same, a feed clamp mounted upon the feeder head and including a rock shaft having a resiliently connected crank arm, a rocker arm, a two membered slidable connection for connecting the rocker arm for oscillatory movement, manually operable means for connecting and disconnecting the members of said connection for movement in unison or the independent movement of one, a clamp on the rocker arm, and a link or rod connected with said crank arm and adjustably engaged by said clamp.

13. The combination with saw feeding and cutter mechanisms and means for actuating the same, of a wiper mounted for reciprocatory and lateral swinging movement, means for imparting reciprocatory movement to the wiper, and a cam carried by the cutter mechanism for imparting lateral swinging movement to the wiper, said means for imparting reciprocatory movement to the wiper including a yielding member.

14. The combination with saw feeding and cutter mechanisms and means for actuating the same, of a wiper mounted for reciprocatory and lateral swinging movement, means for imparting yielding reciprocatory movement to said wiper, and a cam carried and actuated by the cutter mechanism for imparting lateral swinging movement to the wiper.

15. The combination with saw feeding mechanism and means for actuating the same, of cutter mechanism including a laterally movable cutter head and means for actuating the same, a bit clamp having a cam faced head, a wiper mounted for reciprocatory and lateral swinging movement and provided with a wiper finger in the path of said cam faced head, and means for reciprocating the wiper.

16. The combination with saw feeding mechanism and means for actuating same, of cutter mechanism having a laterally movable cutter head, a wiper, a reciprocatory block carrying the wiper, means for actuating said block, the wiper having a slotted pivotal connection with the block, a rocker also carried by the block and provided with an arm having slotted connections with the wiper, a cushion spring between the rocker and the wiper for communicating reciprocatory movement from the former to the latter, and a cam on the cutter head for guiding and imparting lateral swinging movement to the wiper.

17. The combination with saw treating mechanism, of saw feeding mechanism having a reciprocatory feeder head, a spring for moving the head to non-saw feeding position, said feeder head having shoes for riding the saw, a feed clamp carried by the head, a crank arm, a resilient connection between the feed clamp and crank arm, a cam for actuating the crank arm, and means for operating the cam and said feeder head in opposition to the spring.

18. The combination with saw feeding mechanism, and means for actuating the same, of cutter mechanism have coöperating members, and means for actuating one of said members including a reciprocatory cross head, a toggle arm, a pivotal link connecting said cross head and toggle arm, said pivotal link being resiliently held in engagement with one of them, and manually controlled means for actuating the pivotal link to disengage the same to release the cutter mechanism.

19. The combination with saw feeding mechanism and means for actuating the same, of a cutter mechanism having a laterally movable cutter head, a wiper, a reciprocatory block carrying the wiper, means for actuating said block, the wiper having a slotted pivotal connection with the block, a rocker also carried by the block and provided with an arm having a slotted connection with the wiper, a cushion spring between the wiper and the rocker for communicating reciprocatory movement from the former to the latter and also acting as a means to permit the wiper to yield when stopped previous to its full downward movement, and a cam on the cutter head for guiding and imparting lateral swinging movement to the wiper.

In testimony that I claim the foregoing as the invention of JULIEN H. THAYER, I have hereto affixed my signature in the presence of two witnesses.

CHARLIE HOLMES THAYER,
*Administrator of estate of Julien H. Thayer.*

Witnesses:
JOHN B. MCALLISTER,
J. R. ERVIN.

Copies of this patent may be obtained for five cents each, by addressing the "Commissioner of Patents, Washington, D. C."